(12) United States Patent
Stark (10) Patent No.: US 6,273,434 B1
(45) Date of Patent: Aug. 14, 2001

(54) CAPLESS QUICK-GRIP CYLINDER

(76) Inventor: Emil Stark, Kommingerstrasse 48, A-6840 Götzis (AT)

( * ) Notice: Subject to any disclaimer, the term of this patent is extended or adjusted under 35 U.S.C. 154(b) by 0 days.

(21) Appl. No.: 09/363,205

(22) Filed: Jul. 29, 1999

(30) Foreign Application Priority Data

Jul. 29, 1998  (DE) .............................. 198 34 040

(51) Int. Cl.[7] .................................. B23Q 3/02
(52) U.S. Cl. .............. 279/4.06; 92/169.1; 92/171.1; 92/130 B; 269/309; 409/225
(58) Field of Search .................. 279/4.01, 4.06, 279/4.12; 269/21, 26, 309, 310; 92/169.1, 171.1, 130 R, 130 B; 409/225

(56) References Cited

U.S. PATENT DOCUMENTS

| 3,394,631 | * | 7/1968 | Thompson | 92/130 R |
| 5,184,810 | * | 2/1993 | Lebrecht | 269/309 |
| 5,190,272 | * | 3/1993 | Zika et al. | 269/309 |
| 5,335,763 | * | 8/1994 | Katoh | 92/130 B |
| 5,370,378 | * | 12/1994 | Weber et al. | 269/309 |
| 5,415,384 | * | 5/1995 | Obrist et al. | 269/309 |
| 5,456,161 | * | 10/1995 | Yuda et al. | 92/169.1 |
| 5,997,011 | * | 12/1999 | Nordquist | 279/4.01 |
| 6,073,325 | * | 6/2000 | Stark | 269/309 |

FOREIGN PATENT DOCUMENTS

| 43 07 342 A1 | 9/1994 | (DE) . |
| 4315839 | * 11/1994 | (DE) . |
| 296 15 613 U1 | 10/1997 | (DE) . |
| 298 04 730 U1 | 5/1998 | (DE) . |

OTHER PUBLICATIONS

Search Report issued by German Patent Office for corresponding German application (Feb. 09, 1999).

* cited by examiner

*Primary Examiner*—Steven C. Bishop
(74) *Attorney, Agent, or Firm*—Knobbe, Martens, Olson & Bear, LLP (57) ABSTRACT

The present invention concerns a method for manufacture and assembly as well as a capless quick-grip cylinder manufactured by this method with a feed nipple for clamping a carrier plate, also called a pallet, which on a machine tool serves to fix work pieces.

19 Claims, 6 Drawing Sheets

CAPLESS QUICK-GRIP CYLINDER

The present invention concerns a method for manufacture and assembly as well as a capless quick-grip cylinder manufactured by this method with a feed nipple for clamping a carrier plate, also called a pallet, which on a machine tool serves to fix work pieces.

To allow a quick overview of the relationships with the technological background, the following statements are made.

Quick-grip cylinders are needed for clamping devices for clamping work pieces on carrier plates for machine tools. A quick-grip cylinder of this kind is known, for example, from DE-U-296 15 613 by the present applicant. Such a quick-grip cylinder is distinguished in that in an open-topped housing are formed the seats for support of the clamping springs and that the housing is closed off at the top by an associated cap. The cap has a central recess in which, sealed and flush, the feed nipple is slidable in an axial direction under hydraulic action.

The use of a housing for the quick-grip cylinder with an associated cap does however have drawbacks.

Manufacture of the cap requires elaborate machining steps, for the cap must be machined with high precision as a single component; it needs corresponding through-bores extending all round the periphery and distributed over the circumference. Further, it needs high-precision machining at the outer circumference and on an associated shoulder, so that it can be pressed with excess size, with accurate fit, into the open-topped recess of the housing. Therefore a press fit is used, which is linked to suitably high-precision machining of the open-topped housing and associated cap.

Further, there is an axial shoulder which must be machined correspondingly at its outer circumference, because this shoulder must fit snugly against the inner wall of the cylinder with high precision. Further, a recess must be provided in this shoulder, in which an O-ring is laid so that the cap fits sealingly against the cylinder wall of the housing.

There are several known embodiments for connection of the cap to the housing of the quick-grip cylinder.

In a first known embodiment the cap is designed to sit on the housing of the quick-grip cylinder, i.e. the quick-grip cylinder forms an upwardly extended axial attachment on the end of which the cap is placed and screwed fast with corresponding threaded bores. The drawback is that the feed force of the feed nipple passing through the cap can be so great that the cap is deformed.

Since the total height of the quick-grip cylinder (the height of the housing of the cylinder and cap) is precisely fixed, an accumulation of errors can arise if the two heights do not tally.

In another embodiment it is provided that the cap is inserted in an associated open-topped recess of the housing, this recess comprising a peripheral edge, the edge protruding slightly above the surface of the cap. The cap is therefore, as shown in the above-mentioned utility model, encompassed and held in mating relationship by the peripheral edge.

Here, of course, inadmissible deformation of the cap due to a high feed force of the feed nipple is avoided, but the mounting pallet itself is not prevented from warping when the mounting pallet is mounted on the cap and in turn holds a work piece. Similarly there is the risk that, when the work piece is placed directly on the cap, the clamping force which is applied to the work piece by the feed nipple is transmitted via the cap, which then in turn can bend inadmissibly.

Furthermore the assembly of such a quick-grip cylinder is relatively elaborate because first of all with the cap removed the springs must be inserted in the open-topped recess of the housing of the quick-grip cylinder. The springs are here fitted so as to be first inserted in the housing of the quick-grip cylinder in the relaxed state. Then the cap is placed on top and, under the action of a press which acts on the upper side of the cap, the latter is pressed inwards into the housing of the quick-grip cylinder against the force of the springs. Then the cap is screwed to the housing of the quick-grip cylinder with the assembly screws arranged peripherally on the cap.

But with this arrangement there is the drawback that the cap is connected to the housing of the quick-grip cylinder only under force of pressure, which can lead to certain parts on the quick-grip cylinder being damaged while the cap is pressed in. Also the through-bores in the cap must be made to correspond to the associated threaded bores in the housing of the quick-grip cylinder with accurate fitting under the action of force of pressure, in order to allow assembly of the cap at all.

The assembly screws used for connection of the cap to the housing of the quick-grip cylinder have the added drawback that, as a result, valuable area on the surface of the cap is lost, which could be used e.g. for the arrangement of blow-out grooves or blow-out bores. These blow-out bores must then be formed in the cap outside the corresponding fixing bores, which is associated with increased manufacturing costs, and also with a weakening of the material thickness of the cap.

It is therefore the object of the invention to develop a method for the assembly of a quick-grip cylinder, and to design a quick-grip cylinder made by the method, in such a way that a construction of the quick-grip cylinder which is substantially simpler, cheaper, capable of taking higher loads and operationally reliable, is ensured.

The essential point with the present method is that the quick-grip cylinder is assembled from the piston side (that is, the bottom side, and no longer from above, from the side of the cylinder opening.

In a first step, therefore, first the relaxed springs are inserted in their associated recesses in the open-bottomed cylinder housing, in a second step the piston is then inserted in the cylinder chamber, and in a third step a bottom is laid in the open-bottomed recess of the cylinder housing, in a fourth step with a press this bottom is pressed into the cylinder housing until it reaches a stop fixed to the housing, and in a sixth step to prevent sliding of the bottom in an axial direction—seen outwards—a Seeger ring which fixes the cap to the cylinder housing is inserted, in a seventh step the pressure is removed from the bottom, which accordingly moves downwards in an axial direction under the force of the springs, and is applied to the stop fixed to the housing.

All the directions of motion described above (upward and downward) are here referred to a practical example which shows the quick-grip cylinder in its working position.

These directions are however to be transposed in an analogous manner when the quick-grip cylinder is turned over for assembly purposes, so that its bottom side faces upwards.

It is therefore again emphasised that the directions of motion given here refer to when the quick-grip cylinder is in its operative state.

It is therefore an essential characteristic of the invention that a cap on the upper side of the quick-grip cylinder is completely eliminated, because the upper side of the cylinder housing simultaneously forms the cap. A corresponding cap on the upper side is therefore completely eliminated. Instead, a bottom inserted on the lower side is used, which has substantial advantages over the state of the art. For a bottom of this kind does not have to be made precisely at all, because no clamping forces act on it at all. It must only take up the oil pressure, because it is the bottom boundary of the cylinder housing and subject to oil pressure on its surface. Accordingly there is no longer any danger of this cap being warped by inadmissibly high clamping forces.

With the technical instruction given, there are therefore several advantages simultaneously.

Because a cap on the upper side is eliminated and the corresponding screws are no longer necessary, the drawback that the cap could warp under the action of the clamping force is also eliminated. The portion of the cylinder housing on the upper side, the top region, can be made so thick that warping of this region no longer has to be feared.

Another advantage is that, owing to the elimination of the fixing screws for the cap, more space is available for providing blow-out bores, which accordingly can be arranged freely on the surface of the closed-top cylinder housing. These blow-out bores can be arranged in a blow-out ring which is mounted countersunk in a peripheral groove. The blow-out bores are in this case arranged over a circular circumference in the blow-out ring, so that there can be uniform action of compressed air along the ring circumference. This action causes firstly blow-out of drill chips and coolant, and second the very important aspect as a safety precaution for selective pressure reduction of the compressed air applied also to the lower side of the feed nipple through corresponding bores.

Due to the action of compressed air on the lower side of the feed nipple, the latter undergoes a force component in the direction of the arrow 41, that is, out of the cylinder. This force component is calculated from the effective area to which the compressed air is applied, and the available pressure of the air. The air pressure is as a rule between 6 bars and 10 bars, as usually provided in compressed air pipes in machining works. An effective circular area of application with a diameter of 30 mm, for example, in case of a sudden application of pressure yields a projectile-like outward disengaging motion of the feed nipple. Since the latter can be removed from the cylinder, in case of uncontrolled application of pressure to the feed nipple there is the risk of it leaving the quick-grip cylinder like a projectile and injuring the operating personnel.

In order now to obtain a selective pressure decrease for the air pressure when pressurising the compressed air pipe, the compressed air after the pneumatic connection is divided into two air streams. One air stream is conducted downwards for lifting the feed nipple and applying compressed air to the nipple opening after removal of the nipple. The compressed air which then flows out of the nipple opening prevents the entry of drill chips and other foreign bodies which impair the cylinder function.

The second air stream is conducted upwards away from the branch to the blow ring. This partial stream of applied compressed air is also used to blow out the quick-grip cylinder after machining the work piece. However, here blow-out takes place on the upper side of the quick-grip cylinder and is intended for cleaning the bearing surface for the pallet of drill chips and coolant. Due to this branched-off partial stream of compressed air supplied there is a decrease in effective air pressure in the pipe system of the quick-grip cylinder, and hence also at the effective area of application on the lower side of the feed nipple.

Due to selective arrangement and corresponding design of the diameters of the individual supply and blow-out pipes, it is possible to apply the necessary force to the feed nipple for emergence, in order to remove it safely from the cylinder. The compressed air is here reduced inter alia also by escape of the compressed air from the blow bores in the blow ring on the upper side of the quick-grip cylinder.

Hence the object according to the invention with respect to the safety precautions is achieved by these characteristics of the present invention.

An added advantage is that, when tension is applied to the feed nipple, looking up in the operating position, the feed nipple exerts a force on the inside of the housing, at the point where the cap was arranged before. In the state of the art, in case of an inadmissibly high application of force this resulted in the fixing screws between the cap and the housing being torn out or damaged.

This risk no longer exists according to the present invention, as suitably large, stable stops can be provided in the cylinder housing, which avoid damage to the cylinder housing in the top region as described above.

Hence inadmissibly high feed forces are transmitted from the cylinder housing directly to the mounting of the cylinder housing on a mounting surface. This mounting is referred to below as a stop bracket or clamp.

Structurally the novel quick-grip cylinder is distinguished by the following essential characteristics:

The cylinder housing is closed in itself on the top side and forms only a central recess for passage of the feed nipple. The material is joined in one piece with the side surfaces, so that the result is a body of U-shaped profile which is open at the bottom and which in its interior forms the cylinder chamber for receiving the piston.

It is important here that the lower side of the cylinder chamber is bounded by the above-mentioned bottom, in which for assembly purposes the bottom can be displaced in an axial direction with a press into the cylinder chamber, in order to suitably clamp the springs arranged inside the housing.

There is also a stop boundary for this bottom, which prevents the bottom from being displaced outwards out of the cylinder housing. Moreover this bottom is arranged stationarily and in sealed relationship in the cylinder housing and forms the lower boundary of the oil chamber.

In a development of the invention it is provided that the contact surface for the springs of the grip cylinder, which lies opposite the piston, consists of a spring stop whose material is preferably constructed in one piece with the cylinder housing. This stop therefore forms the contact bearing for the spring, with the result that the spring pressure is accordingly kept away from the upper boundary of the cylinder housing.

Therefore a separate stop is formed for the spring assembly, so that the spring action is not directly transmitted to the top boundary of the cylinder housing.

But instead of a spring stop fixed to the housing, a releasable stop in the form of a Seeger ring can be used.

The subject of the present invention follows not only from the subjects of the individual patent claims, but also from the combination of individual patent claims with each other.

All the particulars and characteristics disclosed in the documents, including the abstract, and in particular the spatial construction shown in the drawings, are claimed as essential to the invention as far as they are novel individually or in combination compared with the state of the art.

Below, the invention is described in more detail with the aid of several drawings showing different embodiments. Here, further characteristics essential to the invention and advantages of the invention are apparent from the drawings and the description thereof.

Figure 1:
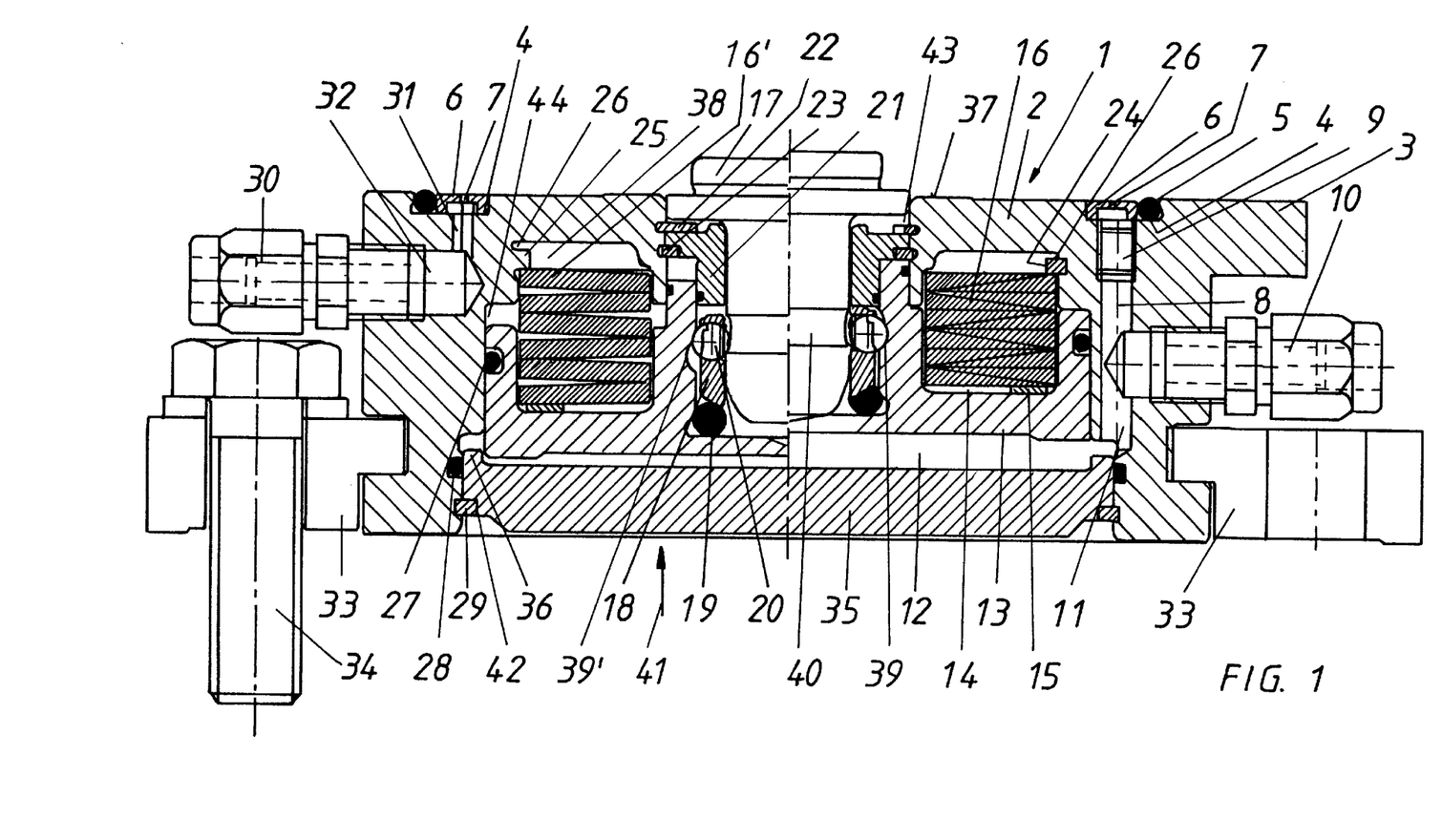
FIG. 1: A split sectional view of the quick-grip cylinder with the feed nipple half in (left) and half out (right)

In general, on the illustration in FIG. 1 it should be noted that it consists of two part-sections, the left half-section showing the quick-grip cylinder 1 in the clamped state, while the right half-section shows the quick-grip cylinder 1 in the released state. The right half shows moreover a Seeger ring 24 which is an alternative to the recess 26 located in the left half. The quick-grip cylinder can therefore be embodied either with the Seeger ring 24 or only with the recess 26.

The illustration in the figure therefore shows a preferred embodiment of a quick-grip cylinder 1. It essentially consists of a housing 2 which—essentially for the present invention—is closed in itself in its upper region and accordingly forms a closed top region whose material is in one piece with the housing 2. Accordingly this region merges with the side flanks, so that this housing 2 forms a round part which inter alia forms the oil chamber 12.

On the housing are integrally formed one or more attachments 3, in which the attachments can have different profile shapes. Such an attachment 3 can be constructed as a square, as a polygon, or as a non-round attachment. It serves to carry a mounting pallet arranged above it and not shown in more detail, and to prevent it from twisting.

The mounting pallet for its part forms a central recess into which the feed nipple 17 extends. The feed nipple 17 is, in a manner not shown in more detail, connected to a clamping element, in which case the clamping element cooperates with the tool to be mounted.

The quick-grip cylinder 1 is mounted with high precision on a lattice-hole pallet, not shown in more detail, with a stop bracket 33 and associated screws 34.

Similarly a mounting on a T-groove bench is provided.

It is important that the top region 37 of the housing 2 is free from fittings. A cap is therefore no longer arranged in this region as was described in the earlier utility model. Hence there is the advantage that in this entire, free top region 37 it is now very easy to form an associated peripheral groove 4 in which is laid, in the embodiment shown, an O-ring 5 in conjunction with a blow ring 6. The blow ring 6 is a metal or plastic part and has a number of blow bores 7 distributed over the upper side, through which compressed air can be discharged upwards in order to remove contaminants such as chips.

The O-ring 5 prevents splashes or immersion water from entering from the outside in a direction towards the feed nipple 17 and the recess occupied by the feed nipple in the housing 2.

The O-ring 5 therefore seals off with the mounting pallet (not shown in the drawings) on top.

For the supply of air to the blow bores 7 there is provided an air inlet 30 which leads via a cross-bore 31 and a channel 32 into the blow bore 7. This cross-bore 31 serves to divide the compressed air supplied, in order on the one hand to guarantee the function of blow-out, and on the other hand to obtain a selective pressure decrease of the compressed air at the effective area of application on the lower side of the feed nipple 17. This measure serves to guarantee operational reliability of the quick-grip cylinder. These characteristics are shown particularly clearly in FIGS. 4 to 11. The top view of the arrangement of the blow ring 6 with the blow bores 7 and O-ring 5 in the quick-grip cylinder can be seen clearly in FIGS. 3 and 13.

On the right of the drawing of FIG. 1 it is also shown that the cross-bore 31 can also be made in another, simple manner, for when machining the housing 2 it is possible to make a channel 8 which passes through from top to bottom and which in its upper portion conducts the air to the blow bores 7, while in its lower portion the oil flow is conducted. To separate the two media, here a grub screw 9 is screwed sealingly into the channel 8, so that the portion above the grub screw 9 is supplied with air, while the lower portion of the channel 8 beyond the grub screw 9 admits oil. For this purpose there is an oil inlet 10 through which the hydraulic oil is introduced via an associated oblique bore 11 into the oil chamber 12. The oil chamber 12 is here bounded at the top by the piston 13, which runs slidably and in sealed relationship in the oil chamber 12 of the cylinder.

The piston 13 here forms recesses 14 which are distributed over the circumference and in which springs 16 are inserted. For better adjustment of the spring force, the latter rest on the piston side on associated distance rings 15 which if necessary—depending on the spring strength—can be varied in thickness.

It is important now that the boundary on the cylinder housing side is produced by spring stops 25, 24.

In the left half-section a stop whose material is in one piece with the housing 2 and which springs in the axial direction of the housing 2 is shown as the spring stop 25. To allow this, above the stop 25 is provided a radial recess 26 which imparts the required spring capacity to the stop 25.

In another, alternative embodiment, in the right half-section it is shown that, instead of this stop 25, a Seeger ring 24 which assumes the same function can be used.

Radially inwards in the spring chamber 38 which receives the respective spring 16 are formed stops fixed to the housing 2.

These stops fixed to the housing however do not take up any spring force, because the springs (constructed as cup springs) are of conical construction and abut against the spring stops 24 or 25 only in load-transmitting relationship.

Moreover the spring chambers 38 are air-filled, i.e. no hydraulic oil passes into these chambers.

The feed nipple 17 sits in the relaxed state (right half-section) on the bottom of the piston 13. The relaxed state is here characterised in that the balls 20 held in a ball cage 18 engage in an associated relief groove 39 in the housing, the balls 20 being accordingly disengaged from the annular groove 40 of the feed nipple 17.

In the clamped state, on the other hand, the balls 20 are disengaged from the relief groove 39' and engage in the annular groove 40 with the result that, owing to the spring force of the spring 16', the feed nipple 17 is displaced The relief groove 39 in the piston therefore, so to speak, serves as a parking space for the balls 20.

In the engaged position of the balls 20 with the annular groove 40 (left half-section), on the other hand, the balls 20 abut against an associated high-precision curvature on the piston, which curvature adjoins the relief groove 39 at the top in an axial direction.

The control ring 19, which is supported on the bottom of the piston 13, has the function of always keeping the ball cage 18 in its raised position. It is of resilient construction and elastically deformable.

Moreover, on the feed nipple 17 is also sealingly arranged a sealing ring 21 which with associated Seeger rings 22, 23 is supported on the housing 2 and held there.

The bottom 35 is held sealingly in the oil chamber 12 with a radially outwardly arranged sealing ring 28. It further forms an axially upwardly extended attachment 36 which preferably extends all round.

It is further prevented from being axially displaced by a Seeger ring 29 at the inner circumference of the housing 2.

For assembly of the quick-grip cylinder 1, the latter is first turned over so that the housing 2 is open at the top and the oil chamber 12 as well as the spring chambers 38 are still connected to each other. The housing 2 is here freed from all fittings.

If now in a preferred embodiment instead of the spring stops 25 protruding at the inner wall of the housing a releasable Seeger ring 24 is used, then the Seeger ring 24 is inserted first. Next all the springs in the relaxed state (spring 16') are inserted in the associated spring chambers 38. If necessary, then a distance ring 15 is placed on top.

Then the whole piston 13 is inserted in the housing 2, and then the bottom 35 is inserted in the oil chamber 12.

Then a pressure is applied to the bottom 35 in arrow direction 41 with a press, not shown in more detail, so that the bottom is displaced axially inwards in arrow direction 41 and the attachment 36 moves towards the associated stop fixed to the housing 2. In this way the springs are now clamped and the fitted situation corresponding to the right half-section in the drawing is obtained.

While maintaining the pressure in arrow direction 41, the Seeger ring 29 is now inserted and fixed, so that in this state there is a gap between the bottom 35 and the inserted Seeger ring 29. If now the pressure is reduced, the bottom 35 moves in the opposite direction to arrow direction 41 in an outward axial direction, and at the same time the Seeger ring 29 thus becomes engaged with the annular groove 42 at the outer circumference of the bottom 35. The latter is now fixed in position and held fast in sealed relationship (sealing ring 28) in the oil inlet 10 and prevented from shifting further. Consequently it can no longer spring out in an axial direction (opposite direction to arrow direction 41). Thus assembly is essentially complete. This results in particularly easy, cheap assembly. The bottom needed up to now, which was arranged on the side on which the pallet is fixed and closed the quick-grip cylinder, is now completely eliminated. Similarly the previously required fixing screws which were necessary to close the bottom are eliminated, and hence also the associated working steps. The result is therefore substantially easier, cheaper assembly as well as a simpler design of the quick-grip cylinder.

Moreover, due to elimination of the cap and associated bores, there are no longer any depressions at the fixing level for the pallet, which hold dirt and chips in a disadvantageous manner and also cause accumulation of water. The surface of the quick-grip cylinder 1 and therefore the top region 37 is accordingly free from all obtrusive fittings and can be kept clean in operation. It can accordingly be kept completely free from chips or dirt by the ball of the thumb or by a cleaning cloth, which was not possible with the previous quick-grip cylinder with cap.

Below, again the importance of the spring stops 24, 25 is emphasised, for the nature and arrangement of which separate independent protection is claimed by the invention described above.

The arrangement of spring stops 24, 25 on the housing side as bearing and support means for the springs 16, 16' has the essential advantage that the spring force is now not directly transmitted to the top region 37 of the housing 2, but with the interposition of a spring body (stops 24, 25) to the outer wall of the quick-grip cylinder 1, so that a risk of warping of the housing 2 in the top region 37 owing to this spring force is avoided. In this way the housing is kept free from such stresses of the spring assembly, and these stresses are transmitted directly to stops uncoupled from the housing. A certain warping of the stops 24, 25 is even permitted to prevent such high forces from acting on the housing 2.

Accordingly at the Seeger ring 24 is also provided an associated recess 26, to ensure that the respective stops 24, 25 can be deformed upwards slightly in an axial direction.

With the previous, above-mentioned design of the quick-grip cylinder with a cap, the drawback was that the force of the spring assemblies was transmitted directly to the inside of the cap, giving rise to the risk of the cap arching and being cambered. The dimensional accuracy was thus impaired.

It is again pointed out that selectively a spring stop 25 fixed to the housing or a Seeger ring 24 can be used.

Of particular advantage on the capless quick-grip cylinder is that the nipple bore 43 in which the feed nipple 17 is held axially slidably can now be machined with high precision, without a cap having to be provided. For the fact is that under a single mounting the nipple bore 43 is machined with a tool from below in arrow direction 41 and at the same time the cylinder bore 44 of the housing 2 can be machined in the same machining step and with the same mounting.

In this way it is ensured that the two bores 43, 44 are arranged with high precision and in line with each other, so that they are oriented precisely concentrically with each other. These two bores determine in general the accuracy of the quick-grip cylinder and the accuracy of the so-called zero-oriented mounting of work pieces.

According to the state of the art, in which a quick-grip cylinder with a cap was provided, it was necessary to machine the cap inner bore with high precision. This affected the points where the nipple passes through, the centring edge of the cap, the point where the cap rests on the housing and the bearing surface of the cap in a direction towards the end face of the cylinder housing and in addition also the outside diameter of the cap. A total of four different surfaces therefore had to be machined with high precision, which was not possible in a single mounted state. Moreover the dimensions of the cap and the cylinder housing had to be adapted to each other and aligned with each other with high precision. This is eliminated according to the present invention, and all that is needed is to machine the nipple bore 43 concentrically with the cylinder bore 44 in a single mounted state, which is straightforward and possible by simple means.

With the cap described above, which cooperated with the quick-grip cylinder, there were also different pairings of materials, which caused additional manufacturing inaccuracies. Moreover higher production costs were caused by the need for the cap to be hardened differently from the housing.

With the present invention only a single, hardened housing 2 is used, in which the bottom 35 can remain soft and be machined only at its outer circumference in such a way that it can be inserted sealingly in the cylinder bore 44. The bottom 35 therefore does not have to be cut round at its outer circumference, because the required sealing action is accomplished with the sealing ring 28.

Thus it has only a sealing function, while the contrasted cap which exists in the state of the art had to be machined with high precision and had to be load-transmitting.

Figure 2:
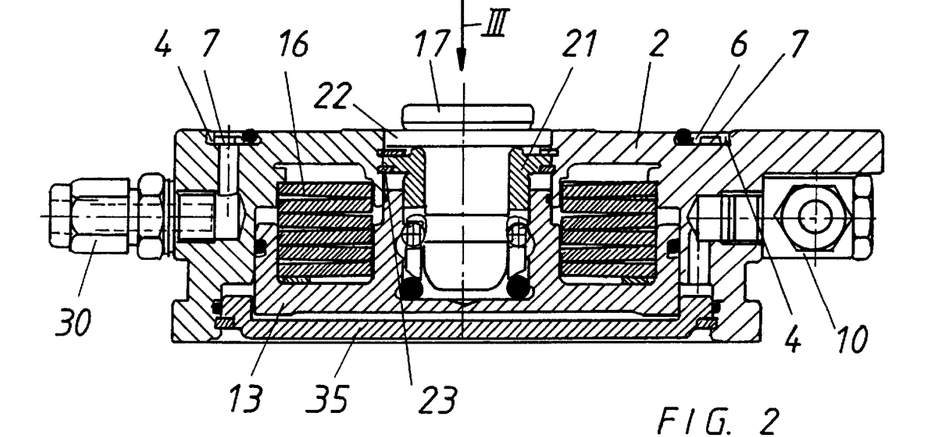
FIG. 2: Also a sectional view of the quick-grip cylinder according to the invention in a second embodiment
Figure 3:
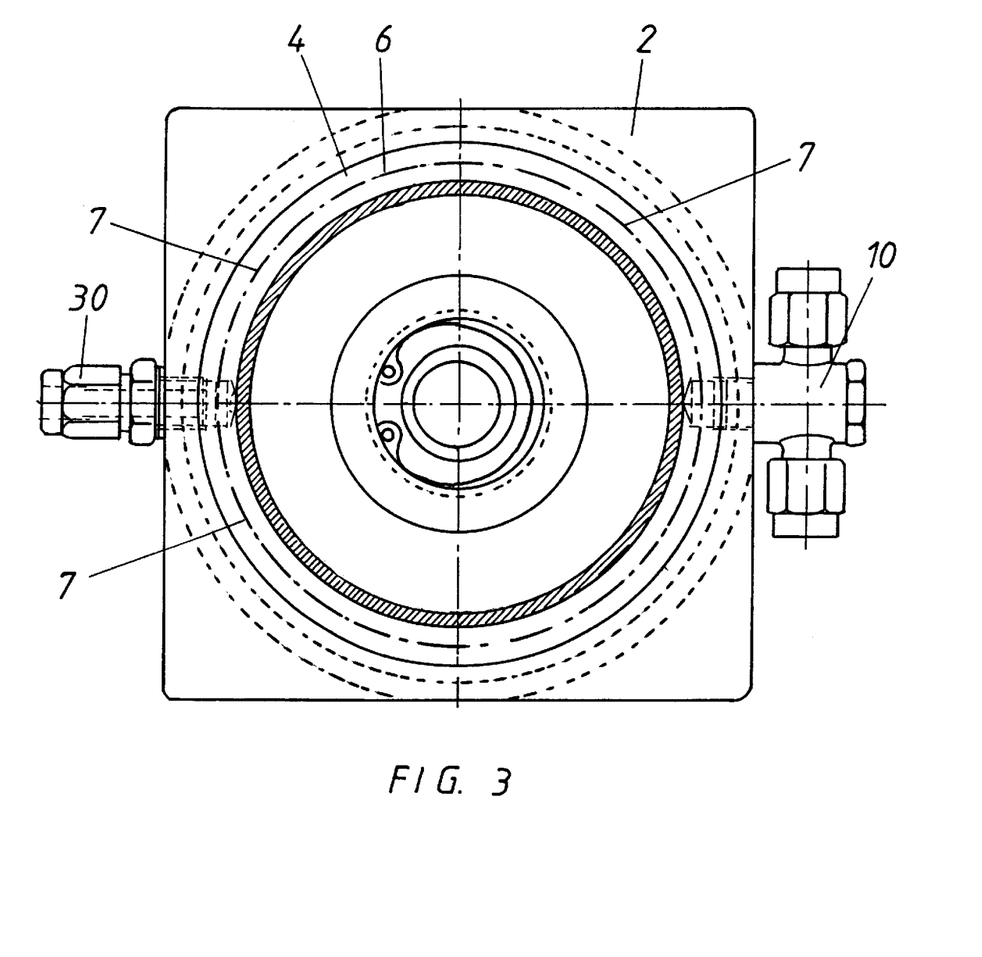
FIG. 3: Top view of the quick-grip cylinder according to the invention as in FIG. 2

FIGS. 2 and 3 show another embodiment in section and in a top view, it being obvious in FIG. 2 that, owing to the ability to exchange the bottom 35, a thinner bottom 35 is inserted to obtain a lower fitted height.

FIGS. 4 to 11 show different variants of bottom designs 35. Here it is essential that the bottom 35 can be constructed in either one or two parts; but it is always exchangeable.

Figure 4:
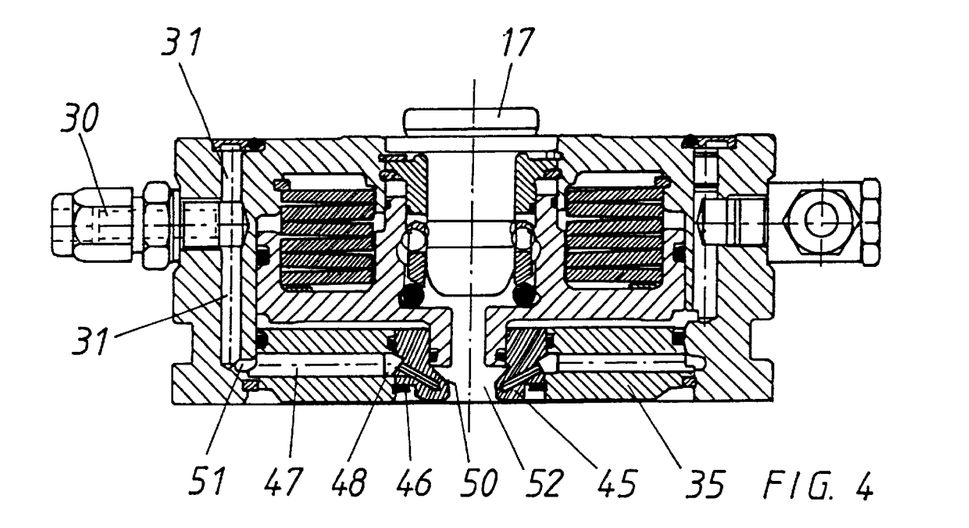
FIGS. 4 to 11: Different sectional views of the quick-grip cylinder according to the invention in a further embodiment

In FIG. 4 it is shown that there is a two-part bottom 35, in which case there is an insert 45 which is fixed by a Seeger ring 46; the injected air passes through the connection piece 30 into the housing, enters the bottom via a cross-channel 47 and passes through a ring channel 48 which is constructed as a recess, into radially obliquely inwardly directed outlet bores 49 which are directed approximately in a direction towards the longitudinal centre axis. From the blow-out bores 49, which are directed obliquely downwards and inwards, obliquely upwardly directed blow-out bores 50 branch off as well.

Moreover it is also pointed out that the cross-channels 47 are arranged evenly distributed over the bottom and extend radially in the bottom and in this case communicate with a ring channel 51 with sealing of air.

Moreover, in this embodiment it is important that, on account of the two-part construction of the bottom 35 with an insert 45 inserted therein sealingly, blow-out openings of any shape can be formed, for the insert 45 is also held exchangeably in the exchangeable bottom 35.

The insert 45 is moreover provided in its centre region with an opening 52 to let out any coolant which might enter the housing of the quick-grip cylinder from above.

Moreover it is pointed out that the blow-out channels 49 lead only into the obliquely upwardly directed blow-out bores, which accordingly produce an inwardly directed and obliquely upwardly directed air stream. For if the feed nipple 17 is removed upwardly from its seat in the cylinder housing, then the nipple bore 43 becomes free and is cleaned by the air jet produced in the blow-out bores 50, directed from bottom to top.

Figure 5:
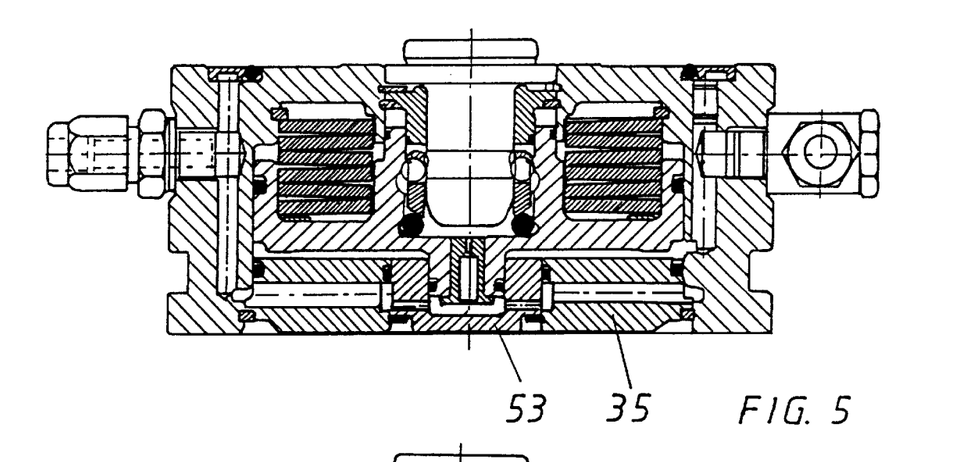

FIG. 5 shows another embodiment of a two-part bottom 35, in which in the bottom 35 is again fitted an insert 53 which is inserted sealingly there. This insert 53 does not have the outlet opening 52 mentioned before with reference to FIG. 4; otherwise the same explanations apply, i.e. there are air bores and blow-out bores which on removal of the feed nipple 17 from its nipple bore 43 produce an upwardly directed air jet for the purpose of cleaning the nipple bore.

Figure 6:
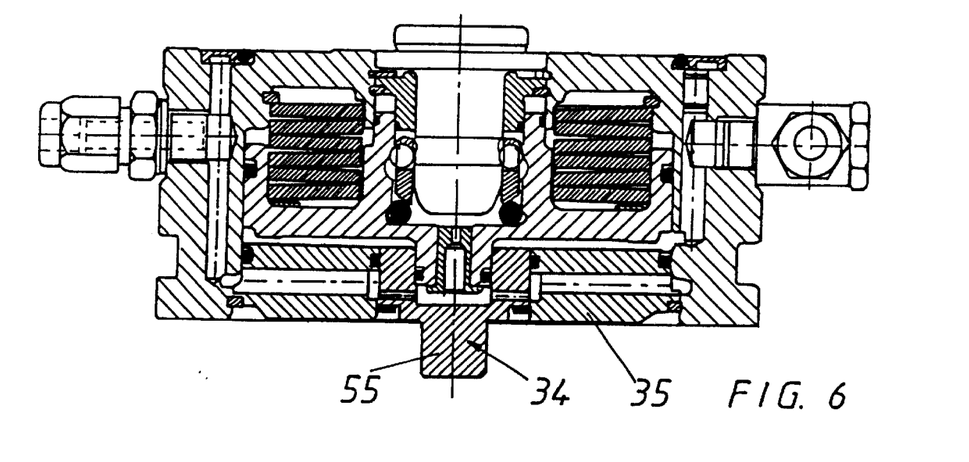

FIG. 6 shows as a further practical example a two-part bottom 35 with an insert 54, which insert has the same function as the above-mentioned insert 53, except that in addition on this insert is mounted a centring attachment 55 which is adapted to engage in a corresponding centring bore in a lattice-hole pallet, in order to position the whole grip cylinder correctly on the mounting pallet.

Figure 7:
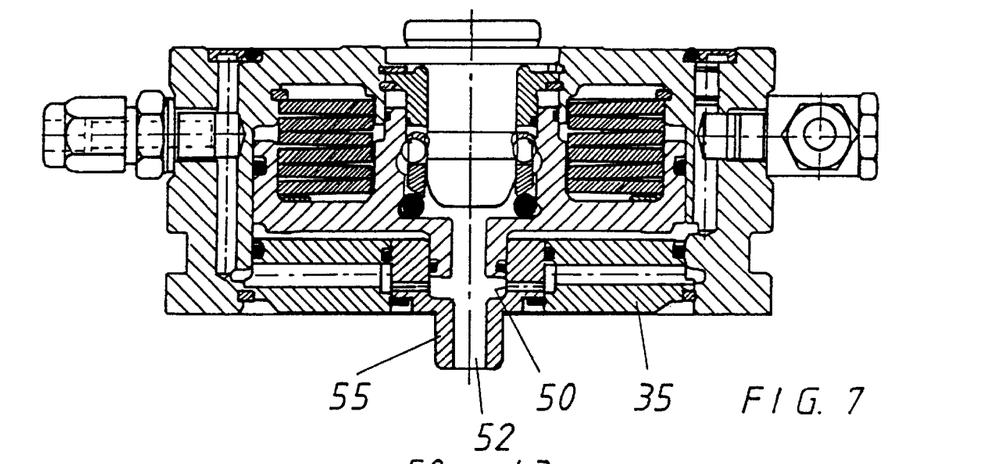

FIG. 7 shows a combination of the designs according to FIG. 4 and FIG. 6, because it can be seen that on the one hand there is an opening 52 to serve as an outlet; also there are blow-out bores 50, and the centring insert 55 which has already been mentioned in FIG. 6 is provided.

Figure 8:
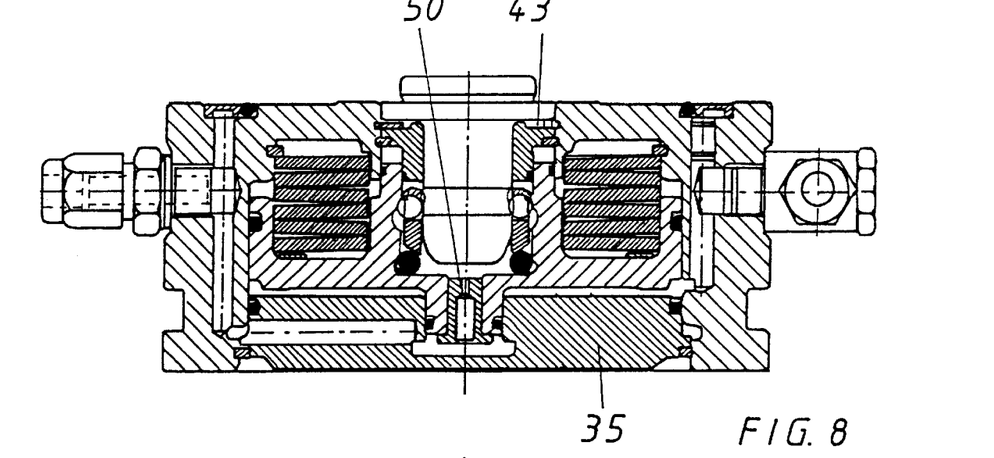
Figure 9:
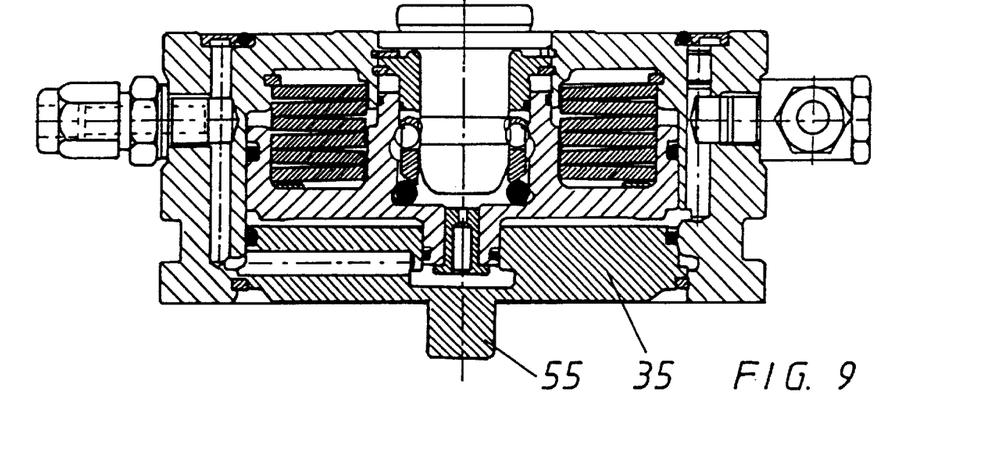

FIG. 8 shows a single-part bottom 35 which forms only a central blow-out bore 50 in a direction towards the nipple bore 43.

In FIG. 9 is again shown a single-part bottom, which however is additionally provided with the above-mentioned centring attachment 55.

Figure 10:
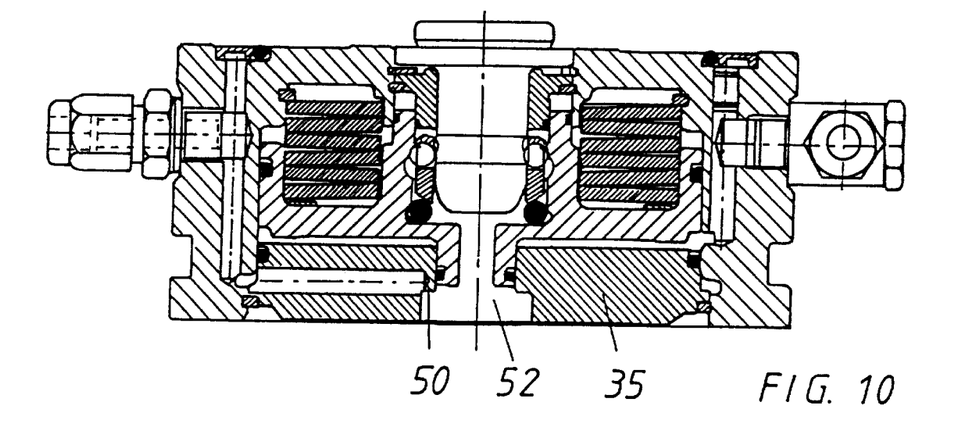

FIG. 10 shows a single-part bottom 35 with an opening 52 which is suitable as an outlet and comprises obliquely downwardly directed blow-out bores 50.

Figure 11:
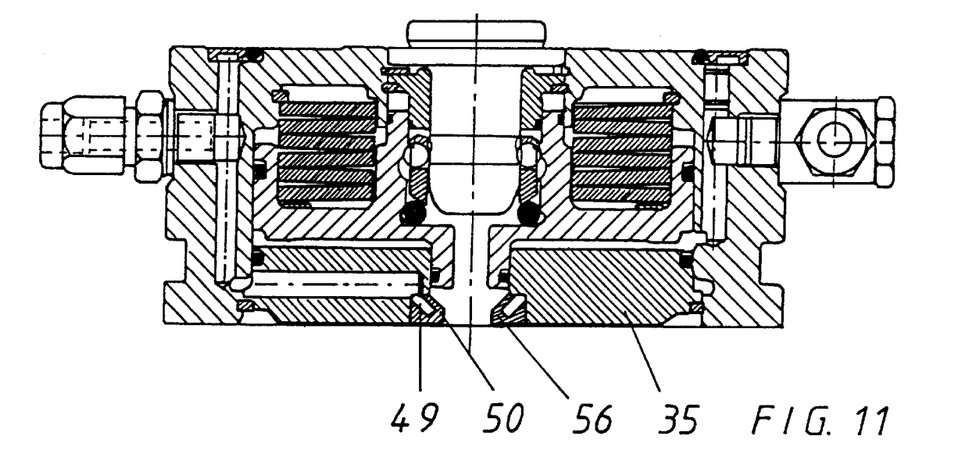

FIG. 11 shows a two-part bottom 35 with an insert 56 which is pressed into the centre bore and which defines blow-out channels 49 which lead into obliquely upwardly directed blow-out bores 50.

With this embodiment the result is that the type of blow-out can be varied appropriately by an exchangeable blow-out insert.

Therefore these embodiments also involve a modular system, from which it is apparent that the bottom 35 can be constructed in one or more parts and that there are exchangeable inserts which serve different purposes.

It follows that, on account of the modular construction in the form of a modular system, customer requirements can also be met, for different inserts can be used at the point of use according to the requirements.

Figure 12:
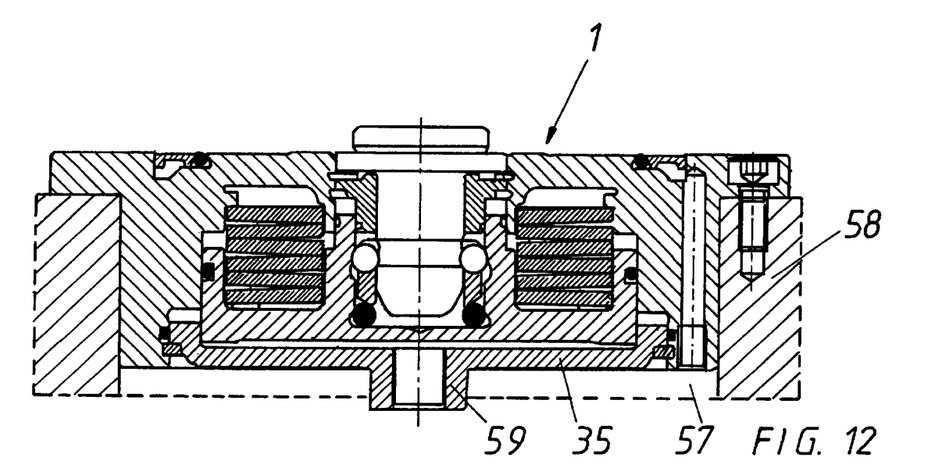
FIGS. 12 and 13: Another embodiment of the quick-grip cylinder in the form of a built-in design.
Figure 13:
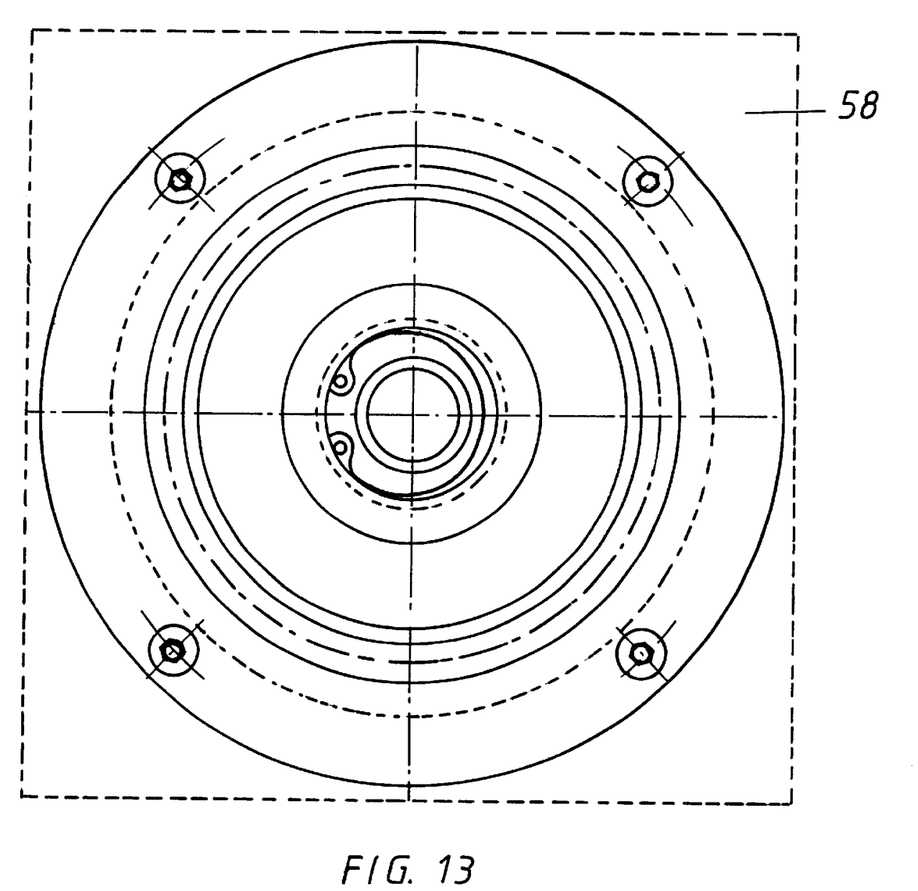

FIGS. 12 and 13 show as a further embodiment that it is not necessary for the solution to fix a quick-grip cylinder 1 to a milling machine bench, as was described with reference to FIG. 1, but FIGS. 12 and 13 involve a built-in solution in which the whole quick-grip cylinder is embedded in a holding opening 57 of a bench 58 or quick-acting closure plate.

In a bench 58 of this kind naturally it is not just a single quick-grip cylinder that can be inserted, but several can be inserted in modular relationship in corresponding holding openings 57 and fixed therein.

The bottom 35 in this case has a hydraulic connection 59 which leads directly into the bottom.

Legend of Drawings 1 quick-grip cylinder
2 housing
3 attachment
4 groove
5 O-ring
6 blow ring
7 blow bore
8 channel
9 grub screw
10 oil inlet
11 oblique bore
12 oil chamber
13 piston face
14 recess
15 distance ring
16 spring
17 feed nipple
18 ball cage
19 control ring
20 ball
21 sealing ring
22 Seeger ring
23 Seeger ring
24 Seeger ring
25 spring stop
26 recess

What is claimed is:

1. A method of manufacturing a capless quick-grip cylinder, comprising:

providing an upper housing having a generally U-shaped profile forming a top wall portion joined as a continuous piece into a downwardly extending side wall, wherein said top wall forms an opening for the passage of a feed nipple, and wherein an underside of said top wall forms least two recesses;

installing said feed nipple within the housing such that said feed nipple is movable in a direction perpendicular to the top wall between a retracted position and a released position;

inserting clamping springs in the recesses;

positioning a cylinder piston with a piston face facing away from the upper surface, wherein the clamping springs urge the cylinder piston away from the upper surface; and closing a bottom of the housing by inserting a bottom plate.

2. The method of claim 1, further comprising applying pressure to the bottom plate to press the bottom plate into the housing until the bottom plate abuts against a stop fixed to the housing, and inserting a Seeger ring in a groove provided therefor in the housing to fix the bottom to the cylinder housing.

3. The method of claim 2, further comprising releasing the pressure so that the bottom plate is forced away from the upper surface in an axial direction towards the Seeger ring by a clamping force exerted by the clamping springs to close the quick-grip cylinder.

4. A quick-grip cylinder, comprising:

a feed nipple;

an upper housing having a generally U-shaped profile having a top portion which is joined as a continuous piece into a downwardly extending side wall, wherein said top portion comprises an opening for said feed nipple, said feed nipple being positioned within the housing and movable in a direction perpendicular to the top portion between a retracted position and a released position, said housing further comprising at least two recesses formed in the bottom surface of said top portion;

at least two clamping springs positioned within the at least two recesses;

a hydraulic piston positioned within the housing and engaging with the housing the at least two clamping springs; and a bottom plate formed as a separate and attached to said housing, said bottom plate enclosing the hydraulic piston and the at least two clamping springs within the housing, wherein the clamping springs urge the piston towards the bottom plate in the retracted position.

5. The quick-grip cylinder according to claim 4, further comprising an oil chamber between the bottom plate and the piston, wherein the bottom plate seals the oil chamber with a sealing ring and wherein a locking ring secures the bottom plate to the quick-grip cylinder.

6. The quick-grip cylinder of claim 5, wherein the bottom plate is constructed in two parts, and wherein the bottom plate comprises an exchangeable insert releasably fixed therein and having a center bore.

7. The quick-grip cylinder of claim 6, further comprising a ring channel, an additional ring channel and outlet bores, wherein the insert cooperates with the ring channel, which serves as a distributor cross-channel, to provide for selective distribution of blow-out air, wherein the insert cooperates with the additional ring channel that is arranged towards a center axis, and wherein the insert cooperates with the outlet bores, which are arranged inwardly and downwardly and to which are connected additional, radially inwardly directed, upwardly extending blow-out bores.

8. The quick-grip cylinder of claim 5, wherein the bottom plate is constructed in two parts, and wherein the bottom plate comprises an insert having a centering attachment for positioning in a coordinate system of a machine tool.

9. The quick-grip cylinder of claim 5, further comprising a hydraulic connection for supplying oil to the oil chamber, wherein hydraulic connection is arranged in the bottom plate.

10. The quick-grip cylinder of claim 5, wherein the housing includes an oil connection for supplying oil to the oil chamber, and an air inlet for supplying the quick-grip cylinder with compressed air.

11. The quick-grip cylinder of claim 4, further comprising spring stops on an interior wall of the housing for the springs.

12. The quick-grip cylinder of claim 4, further comprising spring stops for the springs, wherein the spring stops are formed as split rings that resiliently engage interior wall recesses of the housing.

13. The quick-grip cylinder of claim 4, wherein the at least two recesses of the houses that receive the springs are air-filled and sealed off against entry of hydraulic oil.

14. The quick-grip cylinder of claim 4, wherein the housing includes a bore in a center of the upper surface, the bore configured to receive the feed nipple.

15. The quick-grip cylinder of claim 4, further comprising a blow ring with blow bores distributed over a circumference of the blow ring and connected through a cross-bore to an air inlet, wherein the blow ring is positioned in a top region of the quick-grip cylinder.

16. The quick-grip cylinder of claim 15, wherein the cross-bore divide a stream of compressed air from an air inlet into at least two air streams, and wherein at least one air stream is conducted downwards to a ring channel, and at least one air stream is conducted upwards to the blow ring.

17. The quick-grip cylinder of claim 16, wherein a pressure of the compressed air at a lower side of the feed nipple is controllable by selecting diameters of the bore for supply and blow-out pipes, and by dividing the stream of compressed air into partial streams.

18. The quick-grip cylinder of claim 4, further comprising an O-ring positioned in a groove within an outer side of a top region of the cylinder, wherein the O-ring is in cooperation with the carrier plate and seals off a clamping region between the quick-grip cylinder and the carrier plate.

19. The quick-grip cylinder of claim 4, wherein the quick-grip cylinder is configured to be fixed in at least one opening of a bench, and wherein the quick-grip cylinder is shaped in accordance with requirements of a respective machining step.

\* \* \* \* \*